US012696075B2

(12) United States Patent
Sun et al.

(10) Patent No.: US 12,696,075 B2
(45) Date of Patent: Jul. 28, 2026

(54) METHOD FOR OBTAINING CAPABILITY INFORMATION OF TERMINAL, APPARATUS, AND SYSTEM

(71) Applicant: HUAWEI TECHNOLOGIES CO., LTD., Guangdong (CN)

(72) Inventors: Haiyang Sun, Beijing (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 854 days.

(21) Appl. No.: 17/320,545

(22) Filed: May 14, 2021

(65) Prior Publication Data

US 2021/0274340 A1 Sep. 2, 2021

Related U.S. Application Data

(63) Continuation of application No. PCT/CN2019/103423, filed on Aug. 29, 2019.

(30) Foreign Application Priority Data

Nov. 19, 2018 (CN) .......................... 201811377119.5

(51) Int. Cl.
| | |
|---|---|
| *H04W 8/24* | (2009.01) |
| *H04W 48/16* | (2009.01) |
| *H04W 48/20* | (2009.01) |
| *H04W 60/04* | (2009.01) |
| *H04W 76/11* | (2018.01) |

(52) U.S. Cl.
CPC ............. *H04W 8/24* (2013.01); *H04W 48/16* (2013.01); *H04W 48/20* (2013.01); *H04W 60/04* (2013.01); *H04W 76/11* (2018.02)

(58) Field of Classification Search
CPC ......... H04W 8/18; H04W 8/20; H04W 8/205; H04W 8/22; H04W 8/24; H04W 8/245; H04W 48/00; H04W 48/16; H04W 48/20
See application file for complete search history.

(56) References Cited

U.S. PATENT DOCUMENTS

| | | | | |
|---|---|---|---|---|
| 11,818,746 B2 * | 11/2023 | Fan | ....................... | H04L 41/342 |
| 2019/0268835 A1 * | 8/2019 | Shan | ..................... | H04W 48/16 |
| 2020/0154389 A1 * | 5/2020 | Karampatsis | ....... | H04W 60/005 |

(Continued)

FOREIGN PATENT DOCUMENTS

| | | |
|---|---|---|
| CN | 108702722 A | 10/2018 |

OTHER PUBLICATIONS

ETSI TS 123 503 V15.2.0, "Policy and Charging Control Framework for the 5G System", (3GPP TS 23.503 version 15.2.0 Release 15), Jul. 2018. (Year: 2018).*

(Continued)

*Primary Examiner* — Robert C Scheibel
(74) *Attorney, Agent, or Firm* — Fish & Richardson P.C.

(57) ABSTRACT

Example methods and apparatus for obtaining capability information of a terminal are described. One example method includes sending capability information of a terminal by a second policy control network element to a data management network element in advance for storage, so that a first policy control network element may obtain the capability information of the terminal from the data management network element.

17 Claims, 10 Drawing Sheets

(56) References Cited

U.S. PATENT DOCUMENTS

2021/0037380 A1* 2/2021 Lee ......................... H04W 8/06

OTHER PUBLICATIONS

3GPP TS 29.525 V0.1.0 (Sep. 2018), "3rd Generation Partnership Project; Technical Specification Group Core Network and Terminals; 5G System; UE Policy Control Service; Stage 3 (Release 15)," Sep. 2018, 35 pages.

3GPP TS 23.502 V15.3.0 (Sep. 2018), "3rd Generation Partnership Project; Technical Specification Group Services and System Aspects; Procedures for the 5G System; Stage 2 (Release 15)," Sep. 2018, 329 pages.

3GPP TS 23.503 V15.3.0 (Sep. 2018), "3rd Generation Partnership Project; Technical Specification Group Services and System Aspects; Policy and Charging Control Framework for the 5G System; Stage 2 (Release 15)," Sep. 2018, 69 pages.

Ericsson, "TS 23.501: Clean up of PCF and reference point names for PCC," SA WG2 Meeting #121, S2-173014, Hangzhou, China, May 15-19, 2017, 36 pages.

Huawei, HiSilicon, "Storage of UE Policy in VPLMN," 3GPP TSG-SA WG2 Meeting #128bis, S2-188772, Sophia Antipolis, France, Aug. 20-24, 2018, 3 pages.

Huawei, HiSilicon, "Storage of UE Policy in VPLMN," 3GPP TSG-SA WG2 Meeting #128bis, S2-188848, Sophia Antipolis, France, Aug. 20-24, 2018, 4 pages.

Leach et al., "A Universally Unique IDentifier (Uuid) Urn Namespace," Internet Engineering Task Force, Request for Comments (RFC) 4122 , Jul. 2005, 32 pages.

Nokia, Nokia Shanghai Bell, "Procedures for distribution of UE policies," SA WG2 Meeting #S2-124, S2-178540, Reno, Nevada, USA, Nov. 27-Dec. 1, 2017, 15 pages.

Nokia, Nokia Shanghai Bell, "Update to UE policy provision and update," 3GPP TSG-SA2 Meeting #128, S2-186607, Vilnius, Lithuanian, Jul. 2-6, 2018, 17 pages.

Office Action issued in Chinese Application No. 201811377119.5 on Nov. 3, 2020, 17 pages (with English translation).

PCT International Search Report and Written Opinion issued in International Application No. PCT/CN2019/103423 on Nov. 28, 2019, 11 pages (partial English translation).

Ericsson, "Clarifications on Nudr interactions between PCF and UDR," 3GPP TSG-SA2 Meeting #127, S2-183227, Sanya, China, Apr. 16-20, 2018, 18 pages.

Extended European Search Report issued in European Application No. 19886494.4 on Nov. 8, 2021, 11 pages.

Huawei et al., "UE Policy Delivery," 3GPP TSG-SA2 Meeting #125, S2-180319, Gothenburg, Sweden, Jan. 22-26, 2018, 10 pages.

* cited by examiner

METHOD FOR OBTAINING CAPABILITY INFORMATION OF TERMINAL, APPARATUS, AND SYSTEM

CROSS-REFERENCE TO RELATED APPLICATION

This application is a continuation of International Patent Application No. PCT/CN2019/103423, filed on Aug. 29, 2019, which claims priority to Chinese Patent Application No. 201811377119.5, filed on Nov. 19, 2018. The disclosures of the aforementioned applications are hereby incorporated by reference in their entireties.

TECHNICAL FIELD

This application relates to the field of mobile communications technologies, and in particular, to a method for obtaining capability information of a terminal, an apparatus, and a system.

BACKGROUND

A terminal initiates a registration request to a mobility management network element in an initial registration procedure for accessing a 5th generation (5G) network. The registration request includes information about the terminal. When a dynamic policy is deployed in the network, the mobility management network element executes a policy control network element selection procedure. After selecting a policy control network element, the mobility management network element initiates a policy obtaining procedure to the selected policy control network element and sends the information about the terminal to the selected policy control network element in the policy obtaining procedure. Therefore, the policy control network element may send a terminal policy corresponding to the information about the terminal to the terminal based on the information about the terminal and does not need to send all policies on the policy control network element to the terminal.

After the terminal accesses the 5G network, due to mobility of the terminal, a device serving the terminal, for example, the policy control network element, may change. In addition, there is no interface between different policy control network elements in a same public land mobile network (PLMN). Therefore, a new policy control network element cannot obtain the information about the terminal that is stored on the original policy control network element. Consequently, communication efficiency is reduced, and resources are wasted.

SUMMARY

This application provides a method for obtaining capability information of a terminal, an apparatus, and a system so that a policy control network element obtains capability information of a terminal. This saves resources.

According to a first aspect, this application provides a method for obtaining capability information of a terminal, including: sending, by a first policy control network element, a request to a data management network element, where the request is used to obtain capability information of a terminal; and receiving, by the first policy control network element, the capability information of the terminal from the data management network element, where the capability information of the terminal in the data management network element is from a second policy control network element, and the first policy control network element is a policy control network element that currently serves the terminal. Based on this solution, the second policy control network element may send the capability information of the terminal to the data management network element in advance for storage so that the first policy control network element may obtain the capability information of the terminal from the data management network element. This improves communication efficiency and saves resources.

In a possible implementation method, the method further includes: determining, by the first policy control network element, policy information of the terminal based on the capability information of the terminal; and sending, by the first policy control network element, the policy information to the terminal. Based on this solution, the first policy control network element may determine the policy information of the terminal based on the capability information of the terminal and needs to send only the determined policy information of the terminal to the terminal and does not need to send all policy information on the first policy control network element to the terminal. Therefore, overheads of the first policy control network element may be reduced.

In a possible implementation method, the capability information of the terminal includes an operating system identifier of the terminal, and/or an indication of terminal support for an access network discovery & selection policy.

In a possible implementation method, the second policy control network element is a policy control network element that serves the terminal in an initial registration procedure of the terminal.

In a possible implementation method, the request is Nudr_DM_Query.

According to a second aspect, this application provides a method for obtaining capability information of a terminal, including: receiving, by a data management network element, a request from a first policy control network element, where the request is used to obtain capability information of a terminal; and sending, by the data management network element, the capability information of the terminal to the first policy control network element, where the capability information of the terminal in the data management network element is from a second policy control network element, and the first policy control network element is a policy control network element that currently serves the terminal. Based on this solution, the second policy control network element may send the capability information of the terminal to the data management network element in advance for storage so that the first policy control network element may obtain the capability information of the terminal from the data management network element. This improves communication efficiency and saves resources.

In a possible implementation method, the method further includes: receiving, by the data management network element, the capability information of the terminal from the second policy control network element; and storing, by the data management network element, the capability information of the terminal in a local data structure, where a data set field corresponding to the capability information of the terminal is policy data, and a data subset field corresponding to the capability information of the terminal is a policy set entry or a new field.

In a possible implementation method, the capability information of the terminal includes an operating system identifier of the terminal and/or an indication of terminal support for an access network discovery & selection policy.

According to a third aspect, this application provides a method for obtaining capability information of a terminal, including: obtaining, by a first mobility management network element, capability information of a terminal from a second mobility management network element, where the capability information of the terminal in the second mobility management network element is from the terminal; and sending, by the first mobility management network element, the capability information of the terminal to a policy control network element, where the first mobility management network element is a mobility management network element that currently serves the terminal, and the policy control network element is a policy control network element that currently serves the terminal Based on this solution, the terminal may send the capability information of the terminal to the second mobility management network element in advance for storage so that the first mobility management network element may obtain the capability information of the terminal from the second mobility management network element, and then send the capability information of the terminal to the first policy control network element. This improves communication efficiency and saves resources.

In a possible implementation method, the capability information of the terminal includes an operating system identifier of the terminal, and/or an indication of terminal support for an access network discovery & selection policy.

In a possible implementation method, the method further includes: receiving, by the first mobility management network element, the policy information of the terminal from the policy control network element, where the policy information of the terminal is determined by the policy control network element based on the capability information of the terminal; and sending, by the first mobility management network element, the policy information to the terminal.

According to a fourth aspect, this application provides a method for obtaining capability information of a terminal, including: sending, by a mobility management network element, device identification information of a terminal to a device registration network element; receiving, by the mobility management network element from the device registration network element, capability information that is of the terminal and corresponds to the device identification information of the terminal; and sending, by the mobility management network element, the capability information of the terminal to a policy control network element. Based on this solution, the device registration network element may store an association relationship between the device identification information of the terminal and the capability information of the terminal in advance so that the mobility management network element may obtain the capability information of the terminal from the device registration network element, and then send the capability information of the terminal to the policy control network element. Then, the policy control network element may determine policy information of the terminal based on the capability information of the terminal and needs to send only the determined policy information of the terminal to the terminal, and does not need to send all policy information on the policy control network element to the terminal. This saves resources.

In a possible implementation method, the method further includes: obtaining, by the mobility management network element, the device identification information of the terminal from the terminal; the sending, by a mobility management network element, device identification information of a terminal to a device registration network element includes: sending, by the mobility management network element, a verification request to the device registration network element, where the verification request is used to verify validity of the device identification information of the terminal, and the verification request includes the device identification information of the terminal; and the receiving, by the mobility management network element from the device registration network element, capability information that is of the terminal and corresponds to the device identification information of the terminal includes: receiving, by the mobility management network element from the device registration network element, a verification response for the verification request, where the verification response includes the capability information of the terminal.

In a possible implementation method, the capability information of the terminal includes an operating system identifier of the terminal, and/or an indication of terminal support for an access network discovery & selection policy.

According to a fifth aspect, this application provides an apparatus. The apparatus may be a mobility management network element, a data management network element, or a policy control network element, or may be a chip. The apparatus has a function of implementing any embodiment in the first aspect, the second aspect, the third aspect, or the fourth aspect. The function may be implemented by hardware, or may be implemented by hardware executing corresponding software. The hardware or the software includes one or more modules corresponding to the function.

According to a sixth aspect, an apparatus is provided. The apparatus includes a processor and a memory. The memory is configured to store a computer execution instruction, and when the apparatus runs, the processor executes the computer execution instruction stored in the memory, to enable the apparatus to perform the method according to any one of the first aspect or the possible implementation methods of the first aspect, or perform the method according to any one of the second aspect or the possible implementation methods of the second aspect, or perform the method according to any one of the third aspect or the possible implementation methods of the third aspect, or perform the method according to any one of the fourth aspect or the possible implementation methods of the fourth aspect.

According to a seventh aspect, this application provides a system, including the first policy control network element according to any one of the first aspect and the implementation methods of the first aspect, and the data management network element according to any one of the second aspect and the implementation methods of the second aspect.

According to an eighth aspect, this application provides a system, including the first mobility management network element according to any one of the third aspect and the implementation methods of the third aspect, and the policy control network element according to any one of the third aspect and the implementation methods of the third aspect.

According to a ninth aspect, this application provides a system, including the mobility management network element according to any one of the fourth aspect and the implementation methods of the fourth aspect, the device registration network element according to any one of the fourth aspect and the implementation methods of the fourth aspect, and the mobility management network element according to any one of the fourth aspect and the implementation methods of the fourth aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated, "a plurality of" means two or more than two.

Figure 1A:
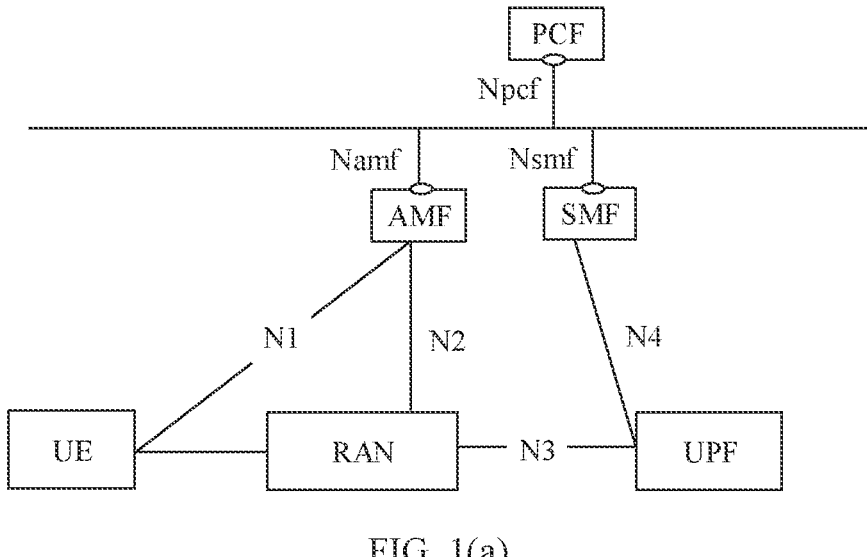
FIG. 1(a) is a schematic diagram of a 5G network architecture according to this application.
Figure 1B:
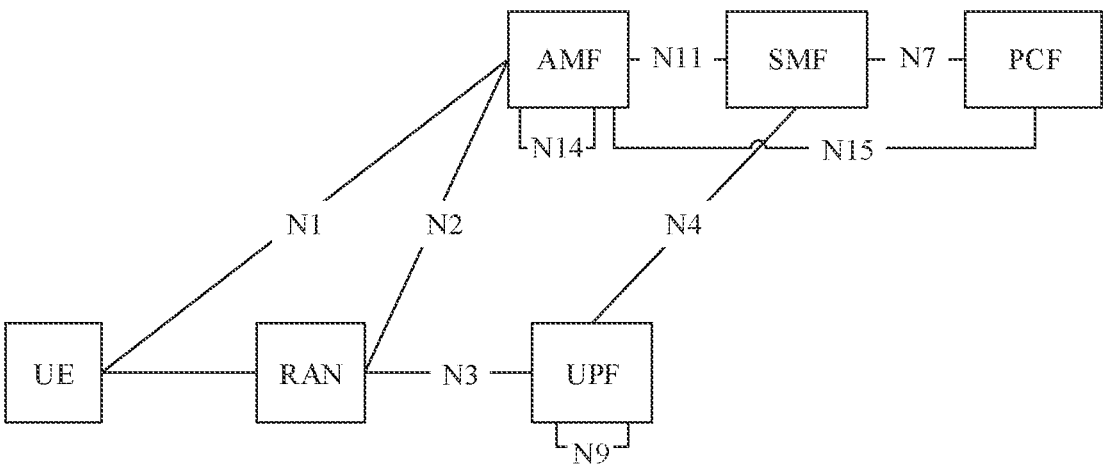
FIG. 1(b) is a schematic diagram of another 5G network architecture according to this application.

FIG. 1(a) and FIG. 1(b) each are a schematic diagram of a 5G architecture in a non-roaming scenario according to this application. FIG. 1(a) shows a 5G architecture using a service-oriented interface, and FIG. 1(b) shows a 5G architecture that is based on a reference point. It should be noted that only some network elements in the 5G architectures are shown in the figures.

As shown in each of FIG. 1(a) and FIG. 1(b), the 5G architecture includes an access network device (where in the figure, the access network device is, for example, a radio access network (RAN) device), a user plane network element (where in the figure, a user plane function (UPF) network element is used as an example), a mobility management network element (where in the figure, the mobility management network element is, for example, an access and mobility management function (AMF) network element), a session management network element (where in the figure, the session management network element is, for example, a session management function (SMF) network element), and a policy control network element (where in the figure, the policy control network element is, for example, a policy control function (PCF) network element).

In the architecture shown in each of FIG. 1(a) and FIG. 1(b), an interface between UE and the AMF network element may be referred to as an N1 interface, an interface between the AMF network element and the RAN device may be referred to as an N2 interface, an interface between the RAN device and the UPF network element may be referred to as an N3 interface, and an interface between the SMF network element and the UPF network element may be referred to as an N4 interface.

In the service-oriented architecture shown in FIG. 1(a), control plane network elements communicate with each other through service-oriented invocation. The AMF network element may provide an Namf-service-oriented interface, the PCF network element may provide an Npcf-service-oriented interface, and the SMF network element may provide an Msmf-service-oriented interface.

In the network architecture based on the reference point shown in FIG. 1(b), control plane network elements communicate with each other through an interface. An interface between the SMF network element and the PCF network element may be referred to as an N7 interface, an interface between the AMF network element and the SMF network element may be referred to as an N11 interface, an interface between the AMF network element and the PCF network element may be referred to as an N15 interface, an interface between different AMF network elements may be referred to as an N14 interface, and an interface between different UPF network elements may be referred to as an N9 interface.

It should be noted that, with evolution of a communication standard, names of the foregoing network elements may change and names of the interfaces between the network elements may also change.

The session management network element includes functions related to a session, for example, session management (such as session establishment, modification, and release, including maintenance of a tunnel between the UPF and an AN), selection and control of the UPF, service and session continuity (SSC) mode selection, and roaming. In 5G communication, the session management network element may be the SMF network element. In future communication such as 6th generation (6G) communication, the session management network element may still be the SMF network element, or may have another name. This is not limited in this application.

The policy control network element includes functions related to a policy, for example, formulating a unified policy, providing policy control, and obtaining subscription information related to a policy decision from a UDR. In 5G communication, the policy control network element may be the PCF network element. In future communication such as 6G communication, the policy control network element may still be the PCF network element, or may have another name. This is not limited in this application.

The mobility management network element includes functions related to access and mobility, for example, connection management, mobility management, registration management, access authentication and authorization, reachability management, and security context management. In 5G communication, the mobility management network element may be the AMF network element. In future communication such as 6G communication, the mobility management network element may still be the AMF network element, or may have another name. This is not limited in this application.

The user plane network element includes functions related to a user plane, for example, data packet routing and transmission, packet detection, service usage reporting, QoS processing, lawful interception, uplink packet detection, and downlink data packet storage. In 5G communication, the user plane network element may be the UPF network element. In future communication such as 6G communication, the user plane network element may still be the UPF network element, or may have another name. This is not limited in this application.

The device registration network element (not shown in the figure) is configured to check a status of a permanent equipment identifier (PEI) (where for example, the permanent equipment identifier is not in a blacklist). In 5G communication, the device registration network element may be a 5G-equipment identifier registration (5G-EIR) network element. In future communication such as 6G communication, the device registration network element may still be a 5G-EIR, or may have another name. This is not limited in this application.

The data management network element (not shown in the figure) is configured to store subscription data, policy information, and the like. In 5G communication, the data management network element may be a unified data repository (UDR). In future communication such as 6G communication, the data management network element may still be a UDR, or may have another name. This is not limited in this application.

The access network device is a device that provides a wireless communication function for a terminal. For example, the access network device includes, but is not limited to, a RAN device, a gNodeB (gNB) in 5G, an evolved NodeB (eNB), a radio network controller (RNC), a NodeB (NB), a base station controller (BSC), a base transceiver station (BTS), a home eNodeB (for example, a home evolved nodeB or a home node B, HNB), a baseband unit (BBU), a transmission reception point (TRP), a transmitting point (TP), a mobile switching center, and the like.

The terminal is a device having a wireless transceiver function, may be deployed on land, and includes an indoor device, an outdoor device, a handheld device, or a vehicle-mounted device; or may be deployed on a water surface (such as on a ship); or may be deployed in air (such as on an aircraft, a balloon, and a satellite). The terminal may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, UE, or the like.

It may be understood that the foregoing functions may be network elements in a hardware device, software functions running on dedicated hardware, or virtualized functions instantiated on a platform (for example, a cloud platform).

This application mainly relates to a mobility management network element, a policy control network element, and a terminal that are in a 5G architecture.

For ease of description, this application is described below by using an example in which the policy control network element is a PCF network element, the mobility management network element is an AMF network element, a data management network element is a UDR, and a device registration network element is a 5G-EIR. Further, the PCF network element is a PCF for short, and the AMF network element is an AMF for short. To be specific, in the subsequent descriptions of this application, the PCF may be replaced with the policy control network element, the AMF may be replaced with the mobility management network element, the UDR may be replaced with the data management network element, and the 5G-EIR may be replaced with the device registration network element.

It should be noted that this application is described by using a 5G non-roaming scenario as an example, and this application is also applicable to a 5G roaming scenario.

In this application, based on the service-oriented architecture shown in FIG. 1(a), that a network element sends a request to another network element means that a service of the another network element is invoked; based on the reference point architecture shown in FIG. 1(b), that a network element sends a request to another network element means that the network element sends a request message to the another network element. A unified description is provided herein, and details are not described later.

Figure 2:
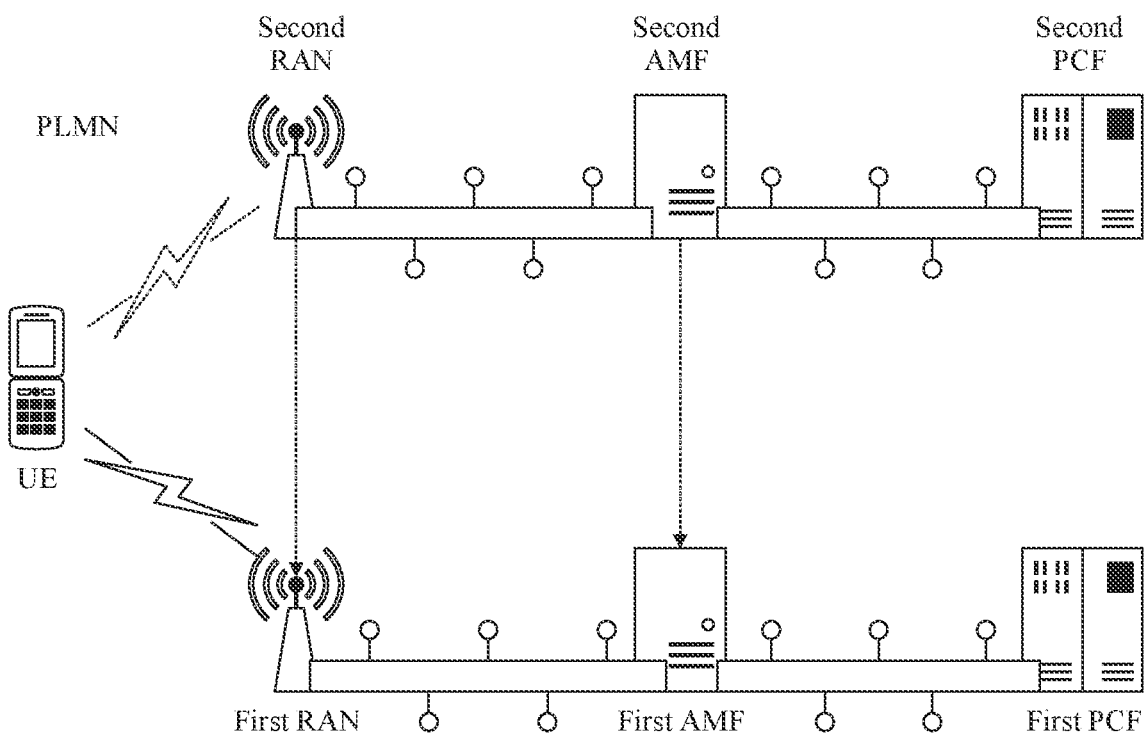
FIG. 2 shows an application scenario to which this application is applicable.

FIG. 2 shows an application scenario to which this application is applicable. Before UE moves, the UE accesses a second RAN, and network elements serving the UE include a second AMF and a second PCF. Due to the movement of the UE, the UE is handed over from the second RAN to a first RAN, an AMF serving the UE changes from the second AMF to a first AMF, and a PCF serving the UE changes from the second PCF to a first PCF. The first PCF is selected by the first AMF.

The first RAN is a RAN that currently serves the UE, the first AMF is an AMF that currently serves the UE, and the first PCF is a PCF that currently serves the UE. The second RAN is a RAN that serves the UE in an initial registration procedure of the UE before the UE moves, the second AMF is an AMF that serves the UE in the initial registration procedure of the UE before the UE moves, and the second PCF is a PCF that serves the UE in the initial registration procedure of the UE before the UE moves.

It should be noted that the first PCF and the second PCF are in a same PLMN. In addition, in a roaming scenario, the PLMN may be referred to as a Home Public Land Mobile Network (HPLMN), the first PCF may be referred to as a first Home Policy Control Function (H-PCF), and the second PCF may be referred to as a second H-PCF.

After the UE accesses a 5G network after the initial registration procedure is performed, the PCF serving the UE may change due to mobility of the UE. In addition, there is no interface between different PCFs in the same PLMN. Consequently, a new PCF cannot obtain information about the UE that is stored on an original PCF. Therefore, when sending a UE policy to the UE, the new PCF can send only all policies on the new PCF, resulting in wastes of resources.

To resolve the foregoing problem, this application provides three different implementation solutions with reference to FIG. 2, which are separately described in the following.

In this application, capability information of the UE may include an operating system identifier (OSID) of the UE, and/or an indication of UE support for an access network discovery & selection policy (ANDSP) (indication of UE support for ANDSP).

Figure 3:
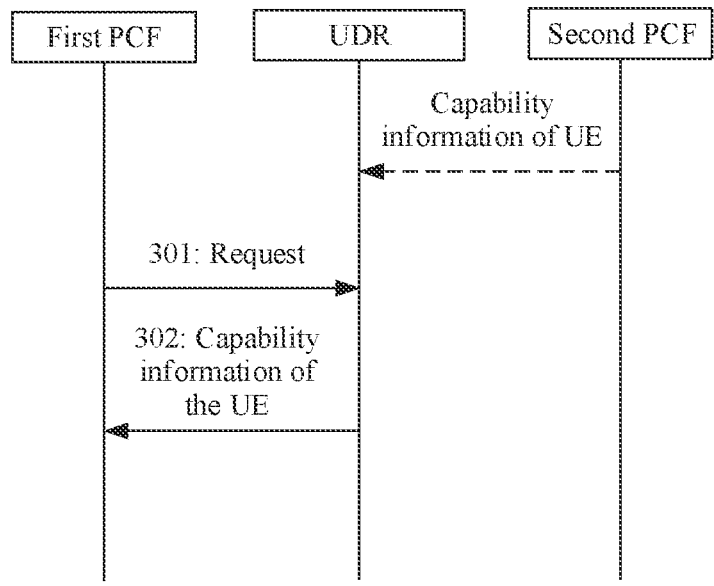
FIG. 3 is a schematic diagram of a method for obtaining capability information of UE according to this application.

FIG. 3 is a schematic diagram of a method for obtaining capability information of UE according to this application. An idea of the method is as follows: In an initial registration procedure of UE, the UE sends capability information of the UE to a second AMF; the second AMF sends the capability information of the UE to a second PCF; and then, the second PCF reports the capability information of the UE to a UDR, and the UDR stores the capability information of the UE. Subsequently, another PCF (for example, a first PCF) may request the capability information of the UE from the UDR. Therefore, the another PCF may obtain the capability information of the UE.

The method includes the following steps.

Step 301: The first PCF sends a request to the UDR. Correspondingly, the UDR may receive the request.

This request is used to obtain the capability information of the UE. The first PCF is a PCF that currently serves the UE.

Optionally, the request is a data management query (Nudr_DM_Query) request.

The capability information of the UE that is stored in the UDR is sent to the UDR by the second PCF that serves the UE in a procedure of initially accessing a network by the UE. The UDR may store the capability information of the UE in a local data structure. For example, the data structure stored in the UDR includes a data set field, and the data set field may include subscription data, application data, policy data, and the like. Further, each data set field may further include a data subset field.

In an implementation, when the UDR stores the capability information of the UE, a data set field corresponding to the capability information of the UE is policy data, and a corresponding data subset field is a policy set entry.

In another implementation, when the UDR stores the capability information of the UE, a data set field corresponding to the capability information of the UE is policy data, a corresponding data subset field is a new field, and the new field is system information (Operation Information).

In still another implementation, when the UDR stores the capability information of the UE, a data set field corresponding to the capability information of the UE is policy data, a corresponding data subset field is a new field, and the new field is UE capability.

Step 302: The UDR sends the capability information of the UE to the first PCF. Correspondingly, the first PCF may receive the capability information of the UE.

Based on the foregoing implementations, the first PCF may obtain the capability information of the UE. This improves communication efficiency and saves resources.

Figure 4:
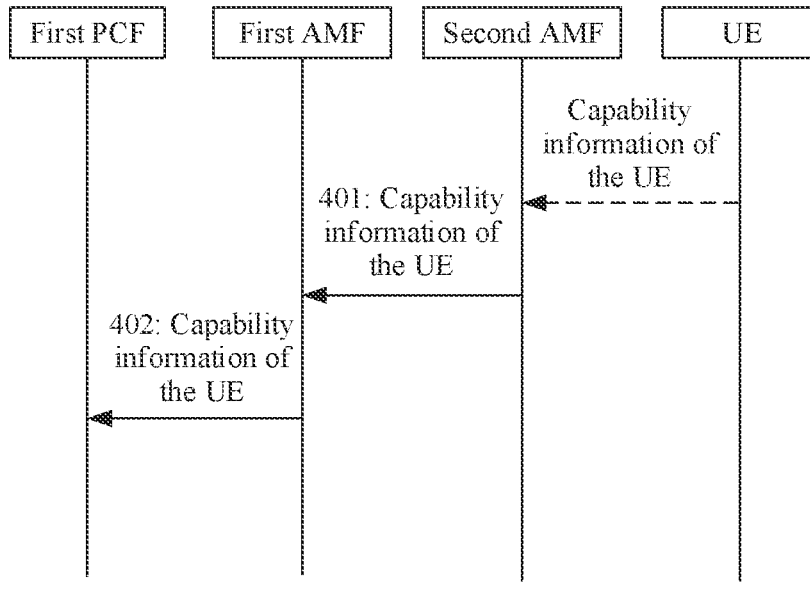
FIG. 4 is a schematic diagram of another method for obtaining capability information of UE according to this application.

FIG. 4 is a schematic diagram of another method for obtaining capability information of UE according to this application. An idea of the method is as follows: In an initial registration procedure of UE, the UE sends capability information of the UE to a second AMF; and the second AMF stores the capability information of the UE. Subsequently, a first AMF may obtain the capability information of the UE from the second AMF, and then the first AMF may send the capability information of the UE to a first PCF selected by the first AMF so that the first PCF may obtain the capability information of the UE.

The method includes the following steps.

Step 401: The first AMF obtains the capability information of the UE from the second AMF.

The capability information of the UE that is stored in the second AMF is sent by the UE to the second AMF in an initial registration procedure, or may be sent to the second AMF by an AMF that serves the UE before the second AMF serves the UE.

Step 402: The first AMF sends the capability information of the UE to the first PCF.

Based on the foregoing implementations, the first PCF may obtain the capability information of the UE. This improves communication efficiency and saves resources.

Figure 5:
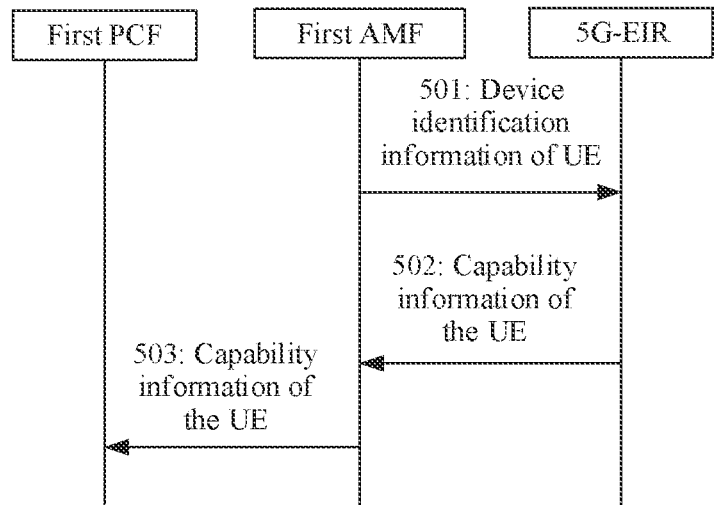
FIG. 5 is a schematic diagram of still another method for obtaining capability information of UE according to this application.

FIG. 5 is a schematic diagram of still another method for obtaining capability information of UE according to this application. An idea of the method is as follows: A 5G-EIR maintains a correspondence between a PEI and capability information of UE. When a PCF serving the UE changes to a first PCF, an AMF may obtain a PEI of the UE from the UE, then obtain, from the 5G-EIR based on the PEI, capability information of the UE that corresponds to the PEI, and then send the obtained capability information of the UE to the first PCF. In this way, the first PCF may obtain the capability information of the UE.

The method includes the following steps.

Step 501: A first AMF sends device identification information of the UE to the 5G-EIR. Correspondingly, the 5G-EIR may receive the device identification information.

In an implementation, the first AMF may obtain the device identification information of the UE from the UE.

The device identification information may be, for example, a PEI.

The correspondence that is between the device identification information of the UE and the capability information of the UE and stored in the 5G-EIR may be pre-configured. Alternatively, in an initial registration procedure of the UE, the AMF may send the device identification information of the UE and the capability information of the UE to the 5G-EIR and then the 5G-EIR stores the correspondence.

After receiving the device identification information of the UE that is sent by the first AMF, the 5G-EIR may locally obtain the capability information of the UE that corresponds to the device identification information.

Step 502: The 5G-EIR sends, to the first AMF, the capability information of the UE that corresponds to the device identification information of the UE. Correspondingly, the first AMF may receive the capability information of the UE.

Step 503: The first AMF sends the capability information of the UE to the first PCF. Correspondingly, the first PCF may receive the capability information of the UE.

Based on the foregoing implementations, the first PCF may obtain the capability information of the UE. This improves communication efficiency and saves resources.

In an implementation, step 502 may be: The first AMF sends a verification request to the 5G-EIR, where the verification request is used to verify validity of the device identification information of the UE, and the verification request includes the device identification information of the UE. Step 503 may be: The first AMF receives a verification response for the verification request from the 5G-EIR, where the verification response includes the capability information of the UE.

In an implementation, in the embodiments shown in FIG. 3 to FIG. 5, after the first PCF obtains the capability information of the UE, the method may further include the following steps.

Step A: The first PCF determines policy information of the UE based on the capability information of the UE.

For example, if the first PCF determines, based on an indication of UE support for an ANDSP in the capability information of the UE, that the UE does not support non-3rd generation partnership project (non-3GPP) access, the first PCF determines not to deliver the ANDSP, that is, determines that the policy information of the UE does not include the ANDSP.

For another example, the first PCF may determine, based on the operating system identifier in the capability information of the UE, to deliver only a UE route selection policy URSP) corresponding to the operating system. That is, the policy information of the UE includes only the URSP corresponding to the operating system identifier of the UE.

Step B: The first PCF sends the policy information to the first AMF. Correspondingly, the first AMF may receive the policy information.

Step C: The first AMF sends the policy information to the UE. Correspondingly, the UE may receive the policy information.

By performing step A to step C, the first PCF may send, to the UE based on the capability information of the UE, the policy information corresponding to the capability information of the UE and does not need to send all policies on the first PCF to the UE. This reduces resource overheads.

It should be noted that, in any one of the foregoing implementations, if the UE moves again, and after the UE moves, the UE is handed over from the first RAN to a third RAN, the AMF serving the UE changes from the first AMF to a third AMF, and the PCF serving the UE changes from the first PCF to a third PCF, the third PCF may also obtain the capability information of the UE by performing any method the same as that of the first PCF.

The following describes specific implementation processes of the embodiments shown in FIG. 3 to FIG. 5 with reference to the accompanying drawings.

The embodiment shown in FIG. 3 is described below with reference to FIG. 6 and FIG. 7.

Figures 6, 7:
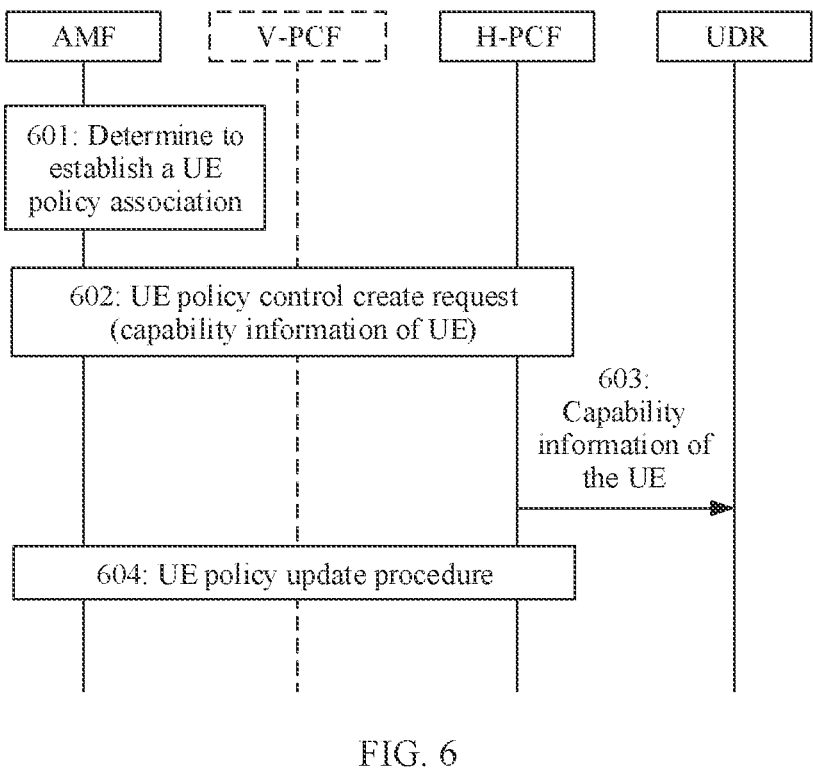
FIG. 6 is a schematic diagram of a UE policy update procedure in an initial registration procedure of UE according to this application.
FIG. 7 is a schematic diagram of a UE policy update procedure in a registration procedure of UE according to this application.

FIG. 6 is a schematic diagram of a UE policy update procedure in an initial registration procedure of UE.

If the UE is in a roaming scenario, the UE is currently in a Visited Public Land Mobile Network (VPLMN), and UE serving the UE includes a Visited Policy Control Function (V-PCF) and an H-PCF. The H-PCF is the second PCF in the embodiment shown in FIG. 3. A UDR in FIG. 6 is a UDR in an HPLMN, and an AMF is the second AMF in the embodiment shown in FIG. 3. In other words, the AMF, the V-PCF, the H-PCF, and the UDR are included in FIG. 6.

If the UE is in a non-roaming scenario, the UE is currently in an HPLMN, and UE serving the UE includes an H-PCF. The H-PCF is the second PCF in the embodiment shown in FIG. 3. A UDR in FIG. 6 is a UDR in the HPLMN, and an AMF is the second AMF in the embodiment shown in FIG. 3. In other words, the AMF, the H-PCF, and the UDR are included in FIG. 6.

The method includes the following steps.

Step 601: The AMF determines to establish a UE policy association.

Step 602: The AMF initiates a UE policy control create request to the H-PCF. Correspondingly, the H-PCF may receive the UE policy control create request.

For example, in the roaming scenario, the AMF sends the UE policy control create request to the V-PCF, and then the V-PCF sends the UE policy control create request to the H-PCF. The UE policy control create request includes a UE policy container, and the UE policy container includes capability information of the UE.

For another example, in the non-roaming scenario, the AMF sends the UE policy control create request to the H-PCF. The UE policy control create request includes a UE policy container, and the UE policy container includes capability information of the UE.

It should be noted that the UE policy container may be sent by the UE to the AMF, and the AMF may not need to parse the UE policy container, but may transparently transmit the UE policy container to the V-PCF.

Step 603: The H-PCF sends the capability information of the UE to the UDR. Correspondingly, the UDR may receive the capability information of the UE.

After receiving the capability information of the UE, the UDR stores the capability information of the UE. Optionally, the H-PCF may further send an identifier of a data set and an identifier of a data subset to the UDR so that the UDR may store the capability information of the UE in a corresponding position based on the identifier of the data set and the identifier of the data subset.

Step 604: Trigger the UE policy update procedure.

For example, in the roaming scenario, the V-PCF and the H-PCF trigger the UE policy update procedure.

For another example, in the non-roaming scenario, the H-PCF triggers the UE policy update procedure.

This step belongs to the prior art, and reference may be made to related descriptions.

According to the foregoing embodiment, in the initial registration procedure of the UE, the capability information of the UE may be sent to the UDR for storage.

FIG. 7 is a schematic diagram of a UE policy update procedure in a registration procedure of UE. The registration procedure is a registration procedure triggered due to movement of the UE after the UE has registered with a network.

If the UE is in a roaming scenario, the UE is currently in a VPLMN, and UE serving the UE includes a V-PCF and an H-PCF. The H-PCF is the first PCF in the embodiment shown in FIG. 3. A UDR in FIG. 6 is a UDR in an HPLMN, and an AMF is the first AMF in the embodiment shown in FIG. 3. In other words, the AMF, the V-PCF, the H-PCF, and the UDR are included in FIG. 6.

If the UE is in a non-roaming scenario, the UE is currently in an HPLMN, and UE serving the UE includes an H-PCF. The H-PCF is the second PCF in the embodiment shown in FIG. 3. A UDR in FIG. 6 is a UDR in the HPLMN, and an AMF is the second AMF in the embodiment shown in FIG. 3. In other words, the AMF, the H-PCF, and the UDR are included in FIG. 6.

In other words, an AMF serving the UE has changed from the second AMF to the first AMF, and a PCF serving the UE has changed from the second PCF to the first PCF.

The method includes the following steps.

Step 701: The AMF determines to establish a UE policy association.

Step 702: The AMF initiates a UE policy control create request to the H-PCF. Correspondingly, the H-PCF may receive the UE policy control create request.

For example, in the roaming scenario, the AMF sends the UE policy control create request to the V-PCF, and then the V-PCF sends the UE policy control create request to the H-PCF.

For example, in the non-roaming scenario, the AMF directly sends the UE policy control create request to the H-PCF.

Step 703: The H-PCF obtains capability information of the UE from the UDR.

For example, the H-PCF sends a query request to the UDR, and then the UDR includes the capability information of the UE in a response.

Step 704: Trigger the UE policy update procedure.

For example, in the roaming scenario, the V-PCF and the H-PCF trigger the UE policy update procedure.

For another example, in the non-roaming scenario, the H-PCF triggers the UE policy update procedure.

This step belongs to the prior art, and reference may be made to related descriptions.

According to the foregoing embodiment, in the registration procedure of the UE, the H-PCF may obtain the capability information of the UE from the UDR.

The embodiment shown in FIG. 4 is described below with reference to FIG. 8 and FIG. 9.

Figure 8:
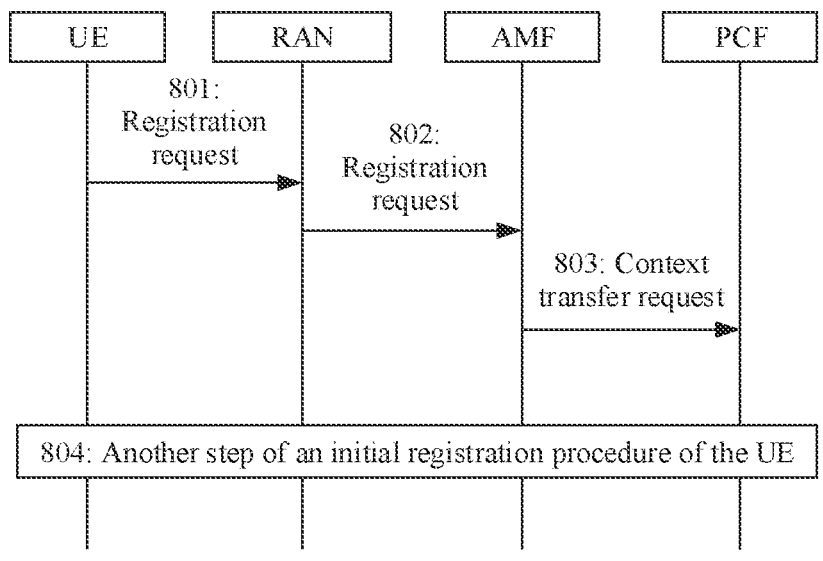
FIG. 8 is a schematic diagram of an initial registration procedure of UE according to this application.

FIG. 8 is a schematic diagram of an initial registration procedure of UE. A RAN, an AMF, and a PCF in FIG. 8 respectively refer to the second RAN, the second AMF, and the second PCF in the embodiment shown in FIG. 4.

The method includes the following steps.

Step 801: The UE sends a registration request to the RAN. Correspondingly, the RAN may receive the registration request.

The registration request includes a UE policy container and a Non-Access Stratum (NAS) mobility management (MM) container. The UE policy container and the NAS MM container each include capability information of the UE. In addition, the AMF can parse the NAS MM container, and the PCF can parse the UE policy container.

Step 802: The RAN sends the registration request to the AMF.

The AMF may obtain the UE policy container and the NAS MM container from the registration request, and parse the NAS MM container to obtain the capability information of the UE.

Step 803: The AMF sends a context transfer request to the PCF. The context transfer request includes the UE policy container. Correspondingly, the PCF may receive the context transfer request.

The PCF can parse the UE policy container to obtain the capability information of the UE.

Step 804: Another step of the initial registration procedure of the UE.

For the another step of the initial registration procedure of the UE in step 804, refer to related descriptions in the prior art.

According to this embodiment, in the initial registration procedure of the UE, the AMF may obtain the capability information of the UE.

Figure 9:
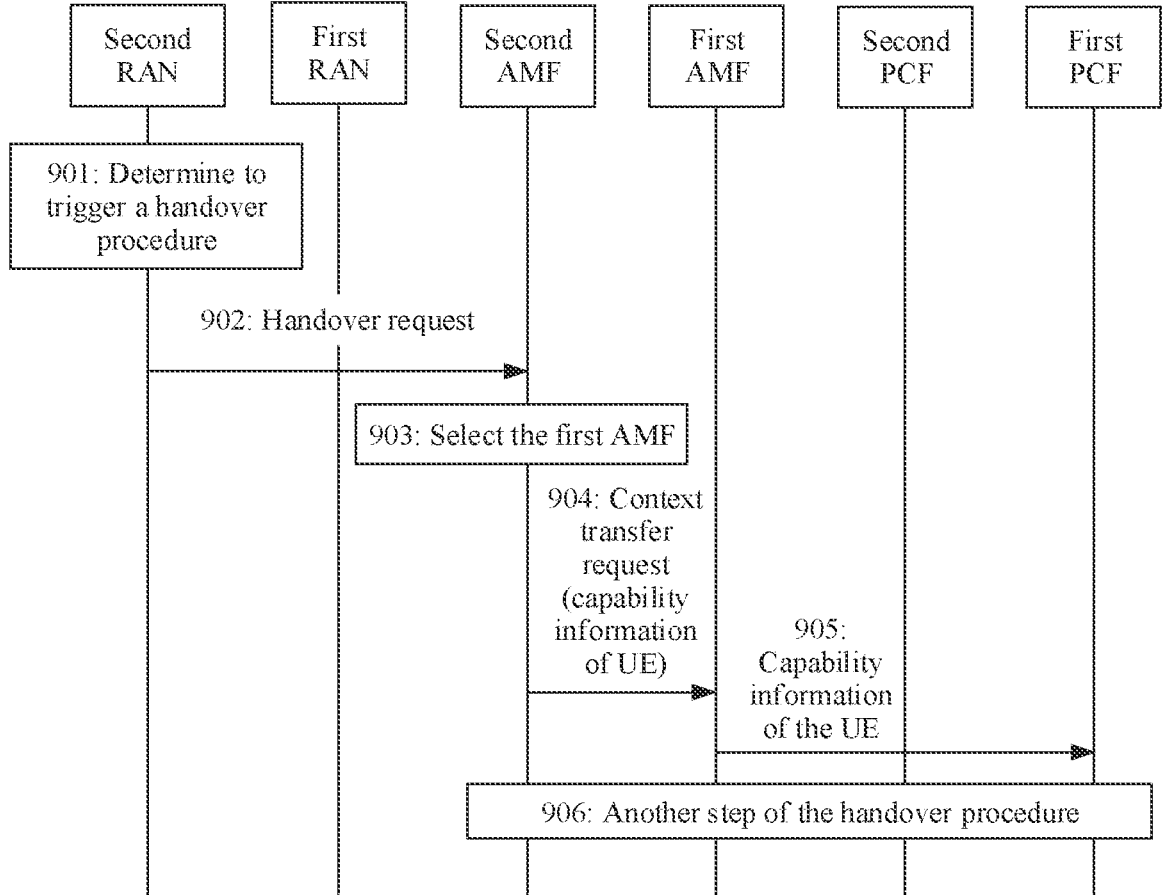
FIG. 9 is a schematic diagram of a handover procedure of UE according to this application.

FIG. 9 is a schematic diagram of a handover procedure of UE. To be specific, due to movement of the UE, the handover procedure of the UE is triggered. In this figure, a second RAN, a second AMF, and a second PCF are network elements that serve the UE before the movement, and a first RAN, a first AMF, and a first PCF are network elements that serve the UE after the movement.

The method includes the following steps.

Step 901: The second RAN determines to trigger the handover procedure.

Due to the movement of the UE, the first RAN determines to trigger the handover procedure.

Step 902: The second RAN sends a handover request to the second AMF. Correspondingly, the second AMF may receive the handover request.

Step 903: The second AMF selects the first AMF.

Step 904: The second AMF sends a context request to the first AMF. Correspondingly, the first AMF may receive the context request.

The context request includes capability information of the UE. The second AMF may obtain the capability information of the UE by performing the method in the embodiment shown in FIG. 8.

Step 905: The first AMF sends the capability information of the UE to the first PCF. Correspondingly, the first PCF may receive the capability information of the UE.

Step 906: Another step of the handover procedure.

For the another step of the handover procedure of the UE in step 906, refer to related descriptions in the prior art.

According to this embodiment, in the handover procedure of the UE, the first PCF may obtain the capability information of the UE.

The embodiment shown in FIG. 5 is described below with reference to FIG. 10 and FIG. 11.

Figure 10:
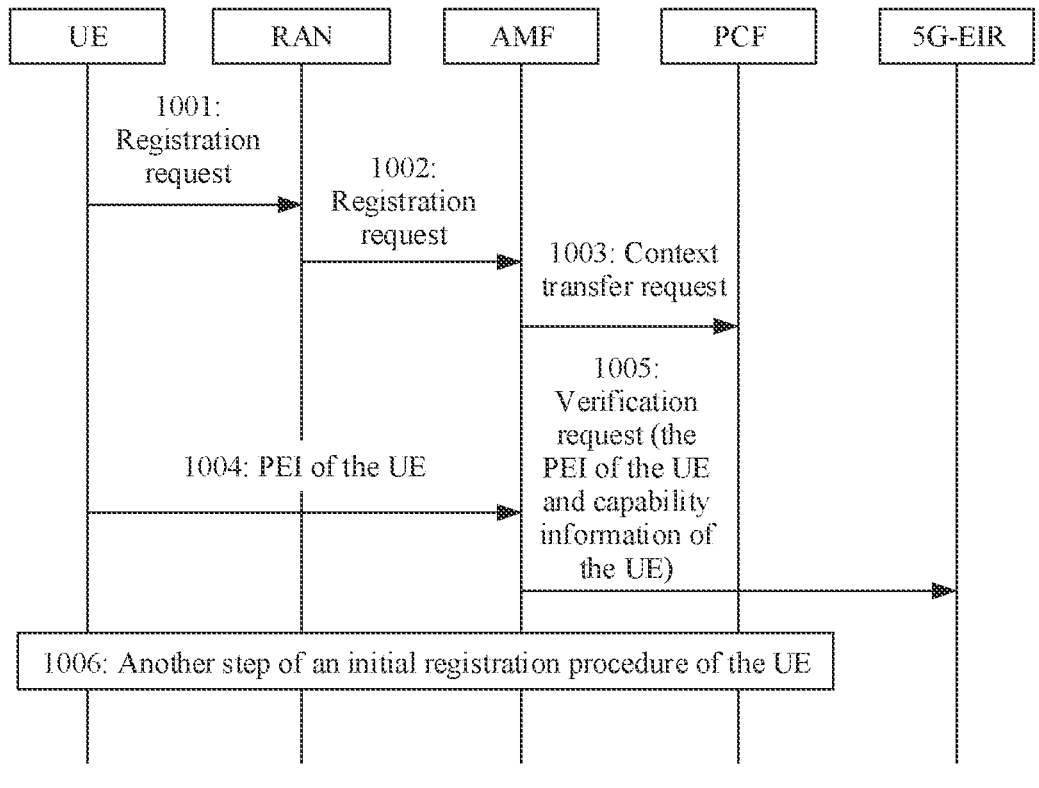
FIG. 10 is a schematic diagram of another initial registration procedure of UE according to this application.

FIG. 10 is a schematic diagram of an initial registration procedure of UE. A RAN, an AMF, and a PCF in FIG. 10 respectively refer to the second RAN, the second AMF, and the second PCF in the embodiment shown in FIG. 5.

The method includes the following steps.

Step 1001 to step 1003 are the same as step 801 to step 803 in the embodiment shown in FIG. 8. Refer to the foregoing descriptions.

By performing the foregoing steps, the AMF may obtain capability information of the UE.

Step 1004: The AMF obtains a PEI of the UE from the UE.

Step 1005: The AMF sends a verification request to a 5G-EIR. The verification request is used to verify validity of the PEI of the UE, and the verification request includes the PEI of the UE and the capability information of the UE.

After receiving the PEI of the UE and the capability information of the UE, the 5G-EIR establishes an association relationship between the PEI of the UE and the capability information of the UE and stores the association relationship.

Step 1006: Another step of the initial registration procedure of the UE.

For the another step of the initial registration procedure of the UE in step 1006, refer to related descriptions in the prior art.

According to this embodiment, in the initial registration procedure of the UE, the 5G-EIR may obtain the association relationship between the capability information of the UE and the PEI of the UE.

Figure 11:
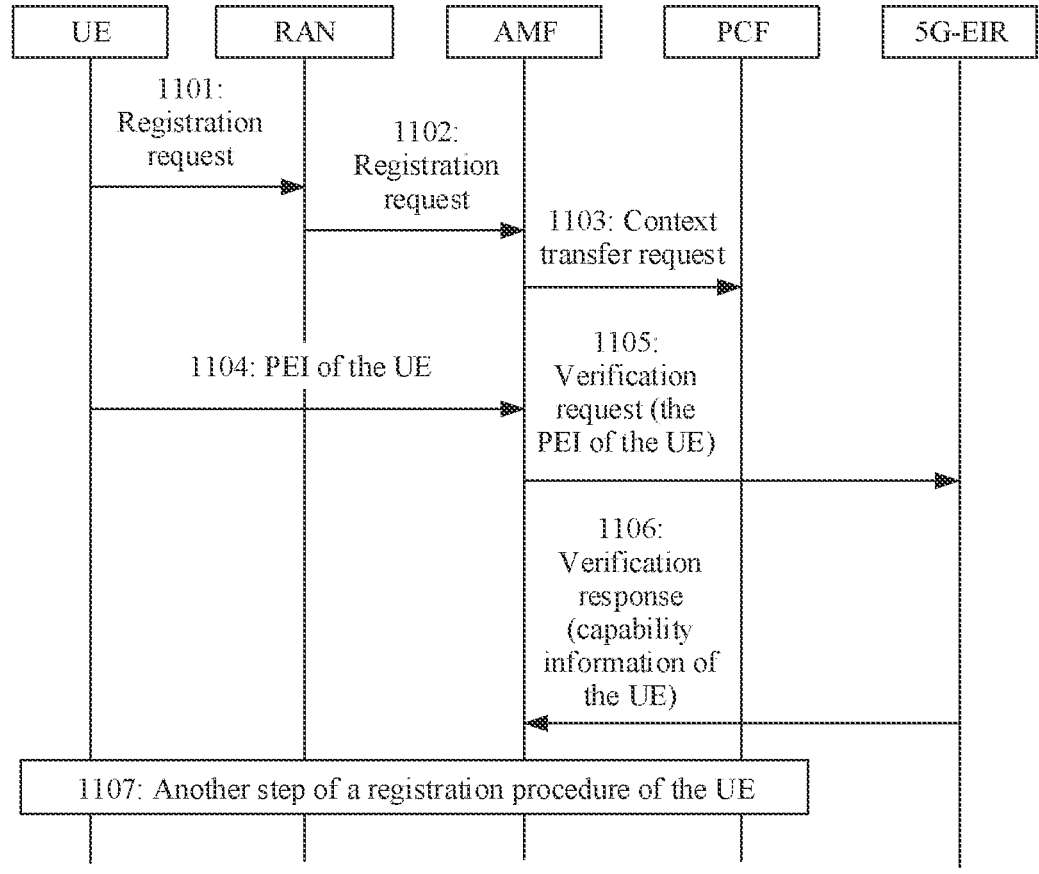
FIG. 11 is a schematic diagram of a registration procedure of UE according to this application.

FIG. 11 is a schematic diagram of a registration procedure of UE. The registration procedure is a registration procedure triggered due to movement of the UE after the UE accesses a network. A RAN, an AMF, and a PCF in FIG. 11 respectively refer to the first RAN, the first AMF, and the first PCF in the embodiment shown in FIG. 5.

The method includes the following steps.

Step 1101: The UE sends a registration request to the RAN. Correspondingly, the RAN may receive the registration request.

Step 1102: The RAN sends the registration request to the AMF. Correspondingly, the AMF may receive the registration request.

Step 1103: The AMF sends a context transfer request to the PCF. Correspondingly, the PCF may receive the context transfer request.

Step 1104: The AMF obtains a PEI of the UE from the UE.

Step 1105: The UE sends a verification request to a 5G-EIR. The verification request includes the PEI of the UE. Correspondingly, the 5G-EIR may receive the verification request.

The 5G-EIR stores an association relationship between the PEI of the UE and capability information of the UE. For example, the 5G-EIR may obtain the association relationship by performing the method in the embodiment shown in FIG. 10.

In step 1105, the 5G-EIR obtains the PEI of the UE in the verification request and then determines, based on the stored association relationship, the capability information of the UE that corresponds to the PEI of the UE.

Step 1106: The 5G-EIR sends a verification response to the UE. The verification response includes the capability information of the UE. Correspondingly, the UE may receive the verification response.

Step 1107; Another step of the registration procedure of the UE.

For the another step of the registration procedure of the UE in step 1107, refer to related descriptions in the prior art.

According to this embodiment, in the registration procedure of the UE, the PCF may obtain the capability information of the UE.

The solutions provided in this application are described above mainly from a perspective of interaction between the network elements. It may be understood that to implement the foregoing functions, each network element includes a corresponding hardware structure and/or software module for implementing each function. A person skilled in the art should easily be aware that, in combination with the units and algorithm steps in the examples described in the embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 12:
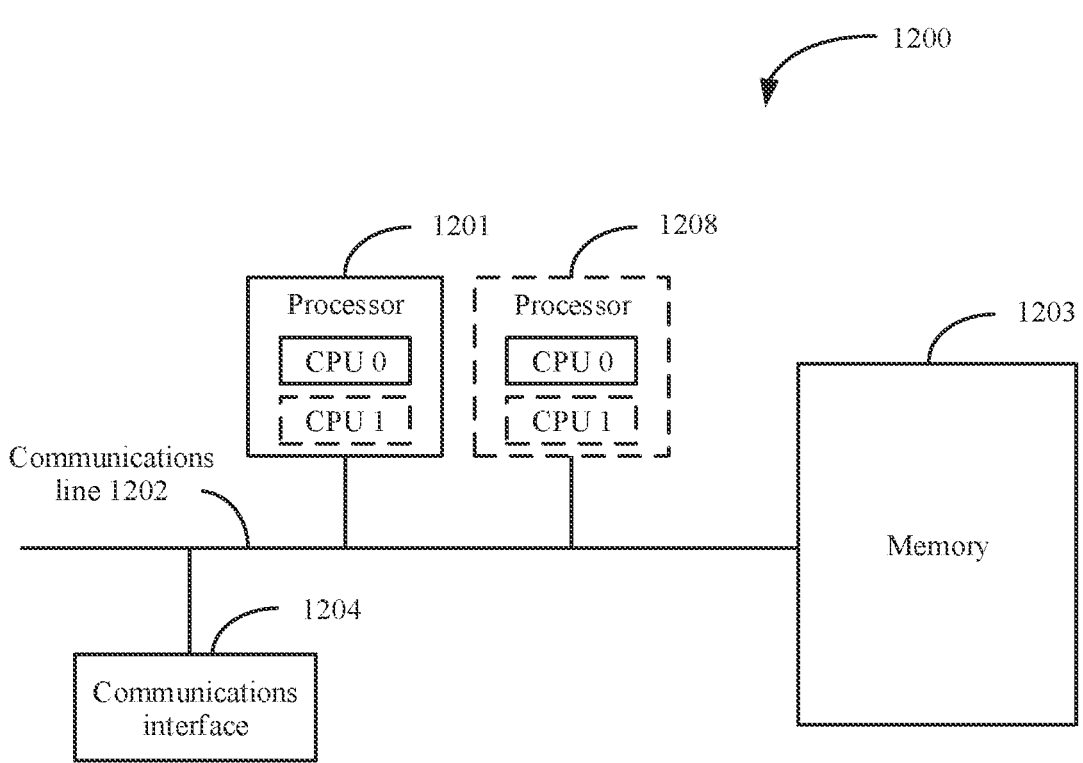
FIG. 12 is a schematic diagram of an apparatus according to this application.

Based on a same invention concept, FIG. 12 is a schematic diagram of an apparatus according to this application. The apparatus may be a policy control network element, a mobility management network element, a data management network element, or a chip, and may perform the method performed by the first policy control network element, the first mobility management network element, or the data management network element in any one of the foregoing embodiments.

The apparatus 1200 includes at least one processor 1201, a communications line 1202, a memory 1203, and at least one communications interface 1204.

The processor 1201 may be a central processing unit (CPU), a microprocessor, an application-specific integrated circuit (ASIC), or one or more integrated circuits configured to control program execution in the solutions of this application.

The communications line 1202 may include a path for transmitting information between the foregoing components.

The communications interface 1204 is any type of apparatus using a transceiver, and is configured to communicate with another device or a communications network, such as Ethernet, a radio access network (RAN), a wireless local area network (WLAN), or a wired access network.

The memory 1203 may be a read-only memory (ROM) or another type of static storage device that can store static information and an instruction, a random access memory (RAM) or another type of dynamic storage device that can store information and an instruction, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently and is connected to the processor through the communications line 1202. The memory may alternatively be integrated with the processor.

The memory 1203 is configured to store a computer execution instruction for performing the solutions in this application, and the processor 1201 controls execution of the computer execution instruction. The processor 1201 is configured to execute the computer execution instruction stored in the memory 1203, to implement the method for obtaining capability information of a terminal provided in the foregoing embodiments of this application.

Optionally, the computer execution instruction in this embodiment of this application may also be referred to as application program code. This is not specifically limited in this embodiment of this application.

During specific implementation, in an embodiment, the processor 1201 may include one or more CPUs, for example, a CPU 0 and a CPU 1 in FIG. 12.

During specific implementation, in an embodiment, the apparatus 1200 may include a plurality of processors, for example, the processor 1201 and a processor 1208 in FIG. 12. Each of the processors may be a single-core (single-CPU) processor, or may be a multi-core (multi-CPU) processor. The processor herein may be one or more devices, circuits, and/or processing cores for processing data (for example, a computer program instruction).

When the apparatus shown in FIG. 12 is a chip, for example, may be a chip of a policy control network element, a chip of a mobility management network element, or a chip of a data management network element, the chip includes the processor 1201 (may further include the processor 1208), the communications line 1202, the memory 1203, and the communications interface 1204. Specifically, the communications interface 1204 may be an input interface, a pin, a circuit, or the like. The memory 1203 may be a register, a cache, or the like. The processor 1201 and the processor 1208 each may be a general-purpose CPU, a microprocessor, an ASIC, or one or more integrated circuits configured to control execution of a program of the data transmission method and/or policy allocation method according to any one of the foregoing embodiments.

Figure 13:
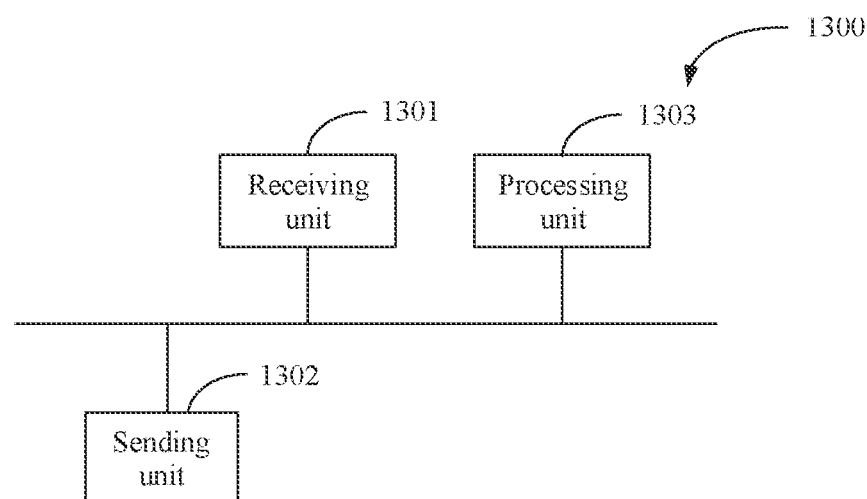
FIG. 13 is a schematic diagram of another apparatus according to this application.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, division into the modules is an example, is merely a logical function division, and may be other division in an actual implementation. For example, when the function modules are obtained through division based on the corresponding functions, FIG. 13 is a schematic diagram of an apparatus. The apparatus 1300 may be the first policy control network element in the foregoing embodiments, a first mobility management network element, a chip of a data management network element, or a chip of a terminal. The apparatus 1300 includes a receiving unit 1301, a sending unit 1302, and a processing unit 1303.

In an implementation:

If the apparatus is a policy control network element or a chip of a policy control network element, the apparatus 1300 may implement the following operations: The sending unit is configured to send a request to a data management network element, where the request is used to obtain capability information of the terminal. The receiving unit is configured to receive the capability information of the terminal from the data management network element. The capability information of the terminal in the data management network element is from a second policy control network element, and the apparatus is a policy control network element that currently serves the terminal.

Optionally, the processing unit is configured to determine policy information of the terminal based on the capability information of the terminal; and the sending unit is further configured to send the policy information to the terminal.

Optionally, the capability information of the terminal includes an operating system identifier of the terminal, and/or an indication of terminal support for an access network discovery & selection policy.

Optionally, the second policy control network element is a policy control network element that serves the terminal in an initial registration procedure of the terminal.

Optionally, the request is Nudr_DM_Query.

In another implementation:

If the apparatus is a mobility management network element or a chip of a mobility management network element, the apparatus 1300 may implement the following operations: The receiving unit is configured to obtain capability information of a terminal from a second mobility management network element, where the capability information of the terminal is sent by the terminal to the second mobility management network element. The sending unit is configured to send the capability information of the terminal to a policy control network element. The apparatus is a mobility management network element that currently serves the terminal, and the policy control network element is a policy control network element that currently serves the terminal.

Optionally, the capability information of the terminal includes an operating system identifier of the terminal, and/or an indication of terminal support for an access network discovery & selection policy.

Optionally, the receiving unit is further configured to receive policy information of the terminal from the policy control network element, where the policy information of the terminal is determined by the policy control network element based on the capability information of the terminal; and the sending unit is further configured to send the policy information to the terminal.

In still another implementation:

If the apparatus is a mobility management network element or a chip of a mobility management network element, the apparatus 1300 may implement the following operations: The sending unit is configured to send device identification information of a terminal to a device registration network element. The receiving unit is configured to receive, from the device registration network element, capability information that is of the terminal and corresponds to the device identification information of the terminal. The sending unit is further configured to send the capability information of the terminal to a policy control network element.

Optionally, the receiving unit is further configured to obtain the device identification information of the terminal from the terminal; the sending unit is specifically configured to send a verification request to the device registration network element, where the verification request is used to verify validity of the device identification information of the terminal, and the verification request includes the device identification information of the terminal; and the receiving unit is specifically configured to receive, from the device registration network element, a verification response for the verification request, where the verification response includes the capability information of the terminal.

Optionally, the capability information of the terminal includes an operating system identifier of the terminal, and/or an indication of terminal support for an access network discovery & selection policy.

In yet another implementation:

If the apparatus is a data management network element or a chip of a data management network element, the apparatus 1300 may implement the following operations: The receiving unit is configured to receive a request from a first policy control network element, where the request is used to obtain capability information of the terminal. The sending unit is configured to send the capability information of the terminal to the first policy control network element. The capability information of the terminal in the data management network element is from a second policy control network element, and the first policy control network element is a policy control network element that currently serves the terminal.

Optionally, the receiving unit is further configured to receive the capability information of the terminal from the second policy control network element; and the processing unit is configured to store the capability information of the terminal in a local data structure. A data set field corresponding to the capability information of the terminal is policy data, and a data subset field corresponding to the capability information of the terminal is a policy set entry or a new field.

Optionally, the capability information of the terminal includes an operating system identifier of the terminal, and/or an indication of terminal support for an access network discovery & selection policy.

It should be understood that the apparatus 1300 may be configured to implement the steps performed by the first policy control network element, the first mobility management network element, or the data management network element in the methods in the embodiments of the present invention. For related features, refer to the foregoing descriptions. Details are not described herein again.

If the apparatus is a policy control network element, a mobility management network element, or a data management network element, the policy control network element, the mobility management network element, or the data management network element is presented in a form of function modules obtained through division in an integrated manner. The "module" herein may be a specific ASIC, a circuit, a processor, and a memory that execute one or more software or firmware programs, an integrated logic circuit, and/or another part that can provide the foregoing functions.

Specifically, functions/implementation processes of the receiving unit 1301, the processing unit 1303, and the sending unit 1302 in FIG. 13 may be implemented by the processor 1201 in FIG. 12 by invoking a computer execution instruction stored in the memory 1203. Alternatively, a function/an implementation process of the processing unit 1303 in FIG. 13 may be implemented by the processor 1201 in FIG. 12 by invoking a computer execution instruction stored in the memory 1203, and functions/implementation processes of the receiving unit 1301 and the sending unit 1302 in FIG. 13 may be implemented through the communications interface 1204 in FIG. 12.

Optionally, when the apparatus 1300 is a chip or a circuit, functions/implementation processes of the receiving unit 1301 and the sending unit 1302 may alternatively be implemented by a pin, a circuit, or the like. Optionally, when the apparatus 1300 is a chip, the memory 1303 may be a storage unit in the chip, for example, a register or a cache.

Certainly, when the apparatus 1300 is a policy control network element, a mobility management network element, or a data management network element, the memory 1303 may be a storage unit that is outside a chip and that is in the policy control network element, the mobility management network element, or the data management network element. This is not specifically limited in this embodiment of this application.

Figures 14, 15:
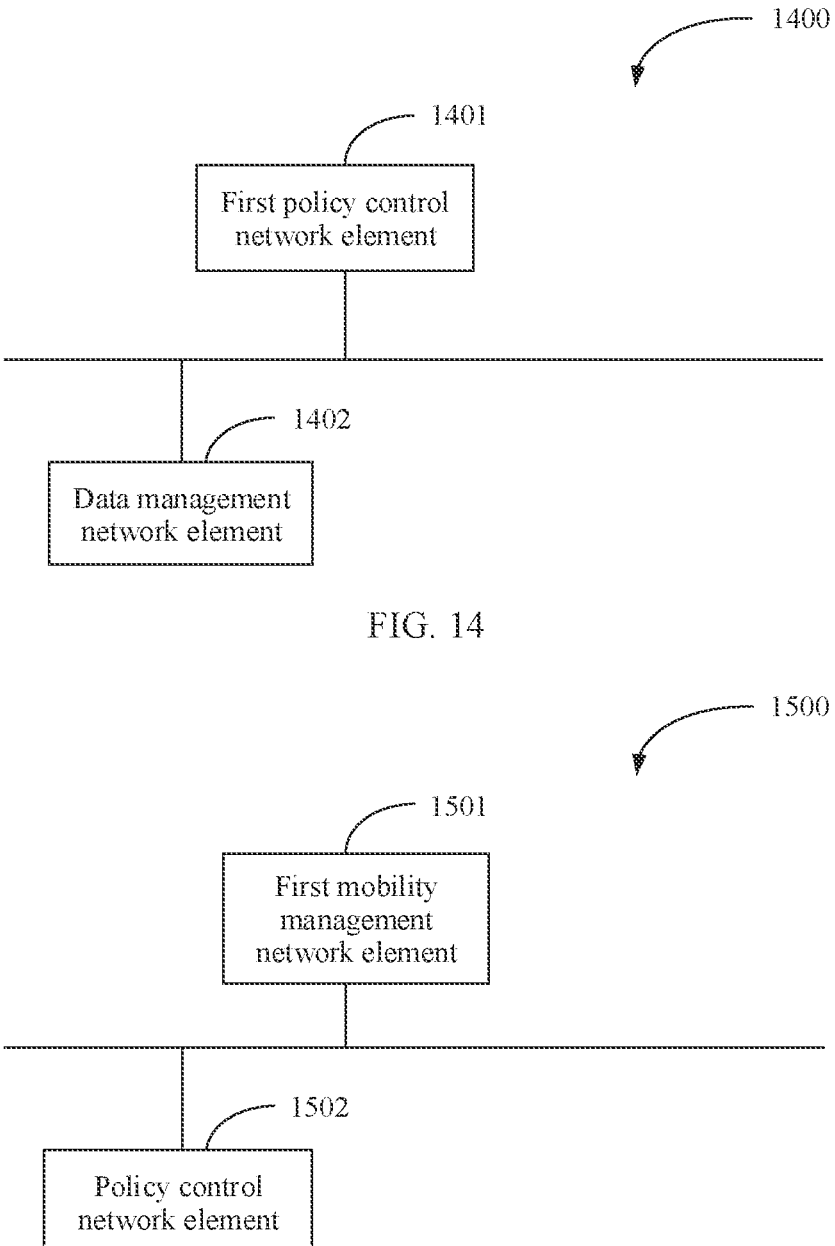
FIG. 14 is a schematic diagram of a system according to this application.
FIG. 15 is a schematic diagram of another system according to this application.

As shown in FIG. 14, this application further provides a system 1400. The system 1400 includes:

a first policy control network element 1401, configured to send a request to a data management network element 1402, where the request is used to obtain capability information of the terminal; and the data management network element 1402, configured to send the capability information of the terminal to the first policy control network element 1401.

The capability information of the terminal in the data management network element is from a second policy control network element, and the first policy control network element 1401 is a policy control network element that currently serves the terminal.

Optionally, the first policy control network element 1401 is further configured to: determine policy information of the terminal based on the capability information of the terminal; and send the policy information to the terminal.

Optionally, the data management network element 1402 is further configured to: receive the capability information of the terminal from the second policy control network element; and store the capability information of the terminal in a local data structure. A data set field corresponding to the capability information of the terminal is policy data, and a data subset field corresponding to the capability information of the terminal is a policy set entry or a new field.

Optionally, the capability information of the terminal includes an operating system identifier of the terminal, and/or an indication of terminal support for an access network discovery & selection policy.

Optionally, the second policy control network element is a policy control network element that serves the terminal in an initial registration procedure of the terminal.

Optionally, the request is Nudr_DM_Query.

For a specific implementation of a related network element in this embodiment, refer to the related descriptions in the foregoing method embodiments. Details are not described herein again.

As shown in FIG. 15, this application further provides another system 1500. The system 1500 includes:

a first mobility management network element 1501, configured to: obtain capability information of a terminal from a second mobility management network element, where the capability information of the terminal in the second mobility management network element is from the terminal, and send the capability information of the terminal to a policy control network element 1502; and the policy control network element 1502, configured to receive the capability information of the terminal from the first mobility management network element 1501.

The first mobility management network element 1501 is a mobility management network element that currently serves the terminal, and the policy control network element 1502 is a policy control network element that currently serves the terminal.

Optionally, the policy control network element 1502 is further configured to: determine policy information of the terminal based on the capability information of the terminal, and send the policy information to the first mobility management network element 1501; and the first mobility management network element 1501 is further configured to:

receive the policy information of the terminal from the policy control network element 1502, where the policy information of the terminal is determined by the policy control network element 1502 based on the capability information of the terminal; and send the policy information to the terminal.

For a specific implementation of a related network element in this embodiment, refer to the related descriptions in the foregoing method embodiments. Details are not described herein again.

Figure 16:
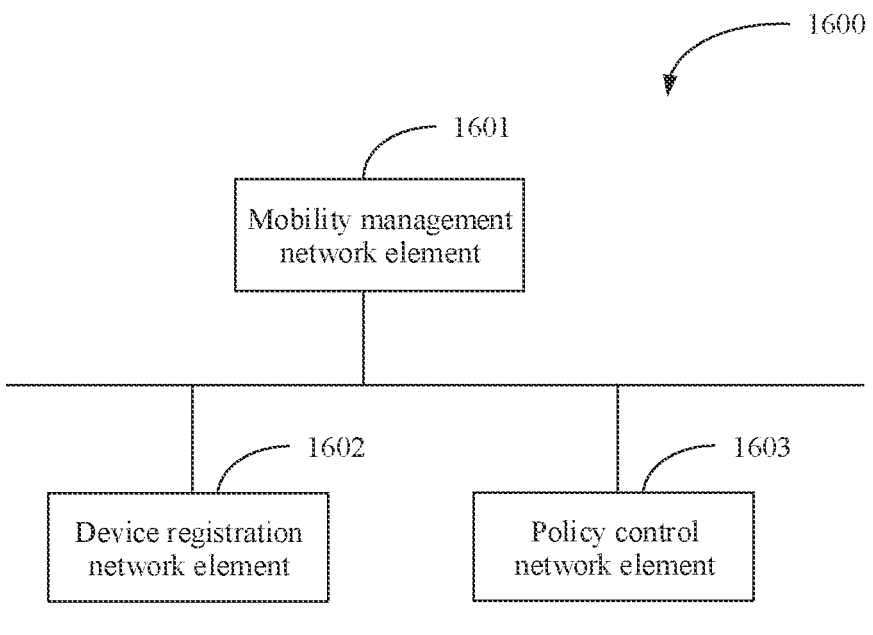
FIG. 16 is a schematic diagram of still another system according to this application.

As shown in FIG. 16, this application further provides still another system 1600. The system 1600 includes:

a mobility management network element 1601, configured to send device identification information of a terminal to a device registration network element 1602; and the device registration network element 1602, configured to send, to the mobility management network element 1601, capability information that is of the terminal and corresponds to the device identification information of the terminal.

The mobility management network element 1601 is further configured to send the capability information of the terminal to a policy control network element.

The policy control network element 1603 is configured to receive the capability information of the terminal from the mobility management network element 1601.

Optionally, the mobility management network element 1601 is specifically configured to: obtain the device identification information of the terminal from the terminal, and send a verification request to the device registration network element 1602, where the verification request is used to verify validity of the device identification information of the terminal and the verification request includes the device identification information of the terminal; and the device registration network element 1602 is specifically configured to send a verification response for the verification request to the mobility management network element 1601, where the verification response includes the capability information of the terminal.

Optionally, the capability information of the terminal includes an operating system identifier of the terminal, and/or an indication of terminal support for an access network discovery & selection policy.

For a specific implementation of a related network element in this embodiment, refer to the related descriptions in the foregoing method embodiments. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

The steps of the methods or algorithms described in the embodiments of this application may be implemented by directly embedded hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may alternatively be integrated into a processor. The processor and the storage medium may be disposed in the ASIC, and the ASIC may be disposed in a terminal device. Optionally, the processor and the storage medium may alternatively be disposed in different components of the terminal device.

These computer program instructions may alternatively be loaded onto a computer or another programmable data processing device so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, it is clear that various modifications and combinations may be made to them without departing from the spirit and scope of the present invention. Correspondingly, the specification and accompanying drawings are merely examples of the present invention defined by the accompanying claims, and are considered as any of or all modifications, variations, combinations or equivalents that cover the scope of the present invention. It is clear that a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for obtaining capability information of a terminal, comprising:

receiving, by a data management network element from a second policy control network element, capability information of a terminal, wherein the capability information of the terminal comprises an identifier of an operating system of the terminal, wherein the second policy control network element serves the terminal in an initial registration procedure;

sending, by a first policy control network element, a request to the data management network element, wherein the request is for obtaining the capability information of the terminal, and wherein the first policy control network element is a policy control network element that currently serves the terminal, and the first policy control network element and the second policy control network element are in a same public land mobile network; and receiving, by the first policy control network element from the data management network element, the identifier of the operating system of the terminal for determining policy information that corresponds to the operating system of the terminal, wherein the policy information comprises a user equipment (UE) route selection policy and an access network discovery and selection policy corresponding to the operating system.

2. The method according to claim 1, wherein the capability information of the terminal comprises an indication of terminal support for an access network discovery and selection policy.

3. The method according to claim 1, wherein the second policy control network element is a policy control network element that serves the terminal before movement of the terminal.

4. The method according to claim 1, wherein the method further comprises:

determining, by the first policy control network element, policy information of the terminal based on the capability information of the terminal; and sending, by the first policy control network element, the policy information to the terminal.

5. The method according to claim 1, wherein the method further comprises:

storing, by the data management network element, the capability information of the terminal in a local data structure, wherein a data set field corresponding to the capability information of the terminal is policy data.

6. A system for obtaining capability information of a terminal, comprising:

a data management network element, configured to receive capability information of a terminal from a second policy control network element, wherein the capability information of the terminal comprises an identifier of an operating system of the terminal, and wherein the second policy control network element serves the terminal in an initial registration procedure; and a first policy control network element, configured to send a request to the data management network element, wherein the request is for obtaining the capability information of the terminal, and wherein the first policy control network element is a policy control network element that currently serves the terminal, and the first Policy control network element and the second policy control network element are in a same public land mobile network;

wherein the data management network element is further configured to:

receive the request; and send the capability information of the terminal to the first policy control network element, wherein the identifier of the operating system of the terminal received by the first policy control network element is used for determining policy information that corresponds to the operating system of the terminal, wherein the policy information comprises a user equipment (UE) route selection policy and an access network discovery and selection policy corresponding to the operating system.

7. The system according to claim 6, wherein the second policy control network element is a policy control network element that serves the terminal in the initial registration procedure.

8. The system according to claim 6, wherein the second policy control network element is a policy control network element that serves the terminal before movement of the terminal.

9. The system according to claim 6, wherein the capability information of the terminal comprises an indication of terminal support for an access network discovery and selection policy.

10. The system according to claim 6, wherein the first policy control network element is further configured to:

determine policy information of the terminal based on the capability information of the terminal; and send the policy information to the terminal.

11. The system according to claim 6, wherein the data management network element is further configured to:

store the capability information of the terminal in a local data structure, wherein a data set field corresponding to the capability information of the terminal is policy data.

12. An apparatus, comprising:

at least one processor; and one or more memories coupled to the at least one processor and storing instructions for execution by the at least one processor to:

receive, from a second policy control network element, capability information of a terminal, wherein the capability information of the terminal comprises an identifier of an operating system of the terminal, wherein the second policy control network element serves the terminal in an initial registration procedure;

receive a request from a first policy control network element, wherein the request is for obtaining the capability information of the terminal, and wherein the first policy control network element is a policy control network element that currently serves the terminal, and the first policy control network element and the second policy control network element are in a same public land mobile network; and send, to the first policy control network element, the capability information of the terminal for determining policy information based on the capability information of the terminal;

wherein the identifier of the operating system of the terminal received by the first policy control network element is used for determining policy information that corresponds to the operating system of the terminal, wherein the policy information comprises a user equipment (UE) route selection policy and an access network discovery and selection policy corresponding to the operating system.

13. The apparatus according to claim 12, wherein the one or more memories store the instructions for execution by the at least one processor further to:

store the capability information of the terminal in a local data structure, wherein a data set field corresponding to the capability information of the terminal is policy data.

14. The apparatus according to claim 12, wherein the capability information of the terminal comprises an indication of terminal support for an access network discovery and selection policy.

15. A method for obtaining capability information of a terminal, comprising:

receiving, by a data management network element from a second policy control network element, capability information of a terminal, wherein the capability information of the terminal comprises an identifier of an operating system of the terminal, wherein the second policy control network element serves the terminal in an initial registration procedure;

receiving, by the data management network element, a request from a first policy control network element, wherein the request is for obtaining the capability information of the terminal, and wherein the first policy control network element is a policy control network element that currently serves the terminal, and the first Policy control network element and the second policy control network element are in a same public land mobile network; and sending, by the data management network element to the first policy control network element, the capability information of the terminal for determining policy information based on the capability information of the terminal;

wherein the identifier of the operating system of the terminal received by the first policy control network element is used for determining policy information that corresponds to the operating system of the terminal, wherein the policy information comprises a user equipment (UE) route selection policy and an access network discovery and selection policy corresponding to the operating system.

16. The method according to claim 15, further comprising:

storing, by the data management network element, the capability information of the terminal in a local data structure, wherein a data set field corresponding to the capability information of the terminal is policy data.

17. The method according to claim 15, wherein the capability information of the terminal comprises an indication of terminal support for an access network discovery and selection policy.

* * * * *